United States Patent Office 3,433,591
Patented Mar. 18, 1969

3,433,591
PROCESS FOR THE PRODUCTION OF CHLORINE AND POTASSIUM SULFATE
Pietro Saccardo, Milan, and Franco Smai, Novate Milanese, Italy, assignors to Montecatini Edison S.p.A., Milan, Italy
No Drawing. Filed May 3, 1966, Ser. No. 547,150
Claims priority, application Italy, May 17, 1965, 11,087/65
U.S. Cl. 23—121    7 Claims
Int. Cl. C01d 5/02; C01b 7/02

ABSTRACT OF THE DISCLOSURE

The preparation of neutral potassium sulfate and chlorine gas by continuously reacting potassium chloride with a mixture of sulfuric, nitrosylsulfuric and nitric acids, whereby there are formed solid potassium sulfate and a gaseous mixture of chlorine and nitrosyl chloride. The nitrosyl chloride is oxidized to chlorine and nitrogen dioxide, which nitrogen dioxide is then treated with sulfuric acid to regenerate the reactant acid mixture. In said reactant mixture the acids are present in substantially equimolar ratios and the same is preheated to elevated temperatures.

---

The present invention relates to a process for the production of chlorine and potassium sulfate, and more particularly it relates to a process for the simultaneous production of chlorine and potassium sulfate from potassium chloride and a mixture of sulfuric acid, nitric acid and nitrosylsulfuric acid.

The utility of $K_2SO_4$ as a fertilizer is well known, and the fact that it is far more valuable as a fertilizer than KCl is an incentive for the producers of KCl to transform the same into $K_2SO_4$.

Chlorine, which is also produced according to the process of the present invention, is likewise a substance of considerable commercial worth.

Other than the process of this invention, no process is known in the art for the production of $K_2SO_4$ from KCl which also permits of the contemporaneous production of chlorine. Processes are known, however, for the production of $K_2SO_4$ from KCl, but these lead to the formation of HCl, which is considerately less attractive in view of its limited commercial applications with respect to chlorine.

It is therefore, a principal object of the present invention to provide a new, simple and economical process for the contemporaneous production of $K_2SO_4$ and chlorine from KCl. A further object of the present invention is that of providing a process for the contemporaneous production of $K_2SO_4$ and chlorine which permits of good conversion and good yields.

These and other objects are attained according to the process of the present invention which, furthermore, offers the desideratum of providing high purity chlorine that does not require further purification.

A further advantage of the process of this invention is that it provides potassium sulfate with a high titer and little residual acidity.

Another advantage is that the process can be effected with simple apparatus.

Briefly, the KCl according to the present invention is continuously reacted with an acid mixture of $H_2SO_4$, $NOHSO_4$ and $HNO_3$, after having heated said reagents from room temperature to reaction temperature, i.e., between 200 and 500° C. In this manner the $K_2SO_4$ is obtained as a solid product and $Cl_2$ and NOCl as gaseous products. The NCOl thus obtained is thence oxidized to $Cl_2$ and $NO_2$, for example, with $O_2$ in the presence of suitable catalysts, and at temperatures of about 400° C.; and the $NO_2$ is then transformed by the action of $H_2SO_4$ into $NOHSO_4$ and $HNO_3$, which reconstitutes the original acid mixture and is suitable for recycling.

In a practical form of the process according to the present invention, the contemporaneous production of chlorine and $K_2SO_4$ is carried out in the following manner:

Into a rotary oven there is continuously introduced KCl and a liquid mixture of $H_2SO_4$, $NOHSO_4$ and $HNO_3$ and the temperature thereof is gradually raised from about 25° C. to 500° C.; and the KCl reacts with said acid mixture according to the following three equations:

(1)    $4KCl + 2H_2SO_4 \rightarrow 4HCl + 2K_2SO_4$ (2)    $HCl + NOHSO_4 \rightarrow NOCl + H_2SO_4$ (3)    $3HCl + HNO_3 \rightarrow NOCl + Cl_2 + 2H_2O$

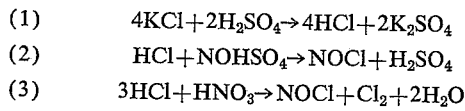

At the outlet of the oven, the potassium sulfate (which is collected) and a gaseous mixture are obtained. By cooling said mixture, the water of condensation is obtained. The water contains diluted 2–3% of HCl and $HNO_3$, and is eliminated as the only waste product of the operating cycle.

The gaseous mixture, now compose dof NOCl and $Cl_2$ in a molar ratio of about 2, is treated, according to any one of the usual methods suitable for conversion to $Cl_2$ from NOCl; for example, in the following manner: adding oxygen to said mixture and passing the same to a reactor containing silica or actived alumina, at temperatures about 400° C.; and while the $Cl_2$ passes unchanged through said catalyst, the NOCl reacts with the $O_2$ according to the following scheme:

(4)    $2NOCl + O_2 \rightarrow 2NO_2 + Cl_2$

and at the outlet of the oven there is obtained chlorine and nitrogen dioxide, with small quantities of unreacted NOCl.

The thus obtained gaseous mixture, which contains $Cl_2$ and $NO_2$ in a molar ratio of about 1, and traces of humidity and NOCl, is then conveyed to a filling tower wherein this mixture passes in counter-current through concentrated $H_2SO_4$; the chlorine, while passing through the $H_2SO_4$ rids itself of the humidity, the NOCl and the $NO_2$, inasmuch as $NO_2$ and NOCl react with $H_2SO_4$.

According to one theory, which has many exponents, $NO_2$, NOCl and $H_2SO_4$ presumably react in the following manner:

(5)    $2NO_2 + H_2SO_4 \rightarrow NOHSO_4 + HNO_3$ (6)    $NOCl + H_2SO_4 \rightarrow NOHSO_4 + HCl$ (7)    $3HCl + HNO_3 \rightarrow Cl_2 + NOCl + H_2O$

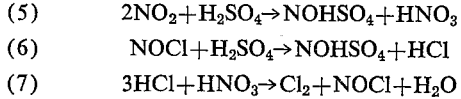

and the NOCl forming during reaction (7) reacts with $H_2SO_4$ according to reaction (6). The substantially pure chlorine, which is obtained according to the above reactions, is collected, whereas the remaining mixture of liquids, which contains $H_2SO_4$, $NOHSO_4$ and $HNO_3$ and exhibits the composition of the starting mixture, is conveyed to the rotary oven for reaction with KCl, thus again commencing the cycle. By feeding the $H_2SO_4$ in a suitable quantity, the above mentioned mixture can be obtained with such a composition that the three components are present in equimolecular quantities, and thus the mixture would therefore be directly recyclable.

The titer of the resultant potassium sulfate varies according to the purity of the KCl starting material. The impurities of the cycle are exclusively $H_2SO_4$ up to 0.5–1% by weight, and HCl up to 0.2–0.5% by weight, both in the form of free acidity, which can be readily and easily eliminated by neutralization with KOH or $K_2CO_3$. The yield of $K_2SO_4$ is practically quantitative with respect to potassium, as it can be influenced only by the value of normal losses taking place during the operating phase.

The $K_2SO_4$ final product is in the form of hard homogeneous white coloured granules which are difficult to crumble.

The $Cl_2$, which is completely anhydrous, contains about 2% HCl as an impurity and traces of $NO_2$. The yield of $Cl_2$ with respect to KCl is about 98%.

The temperature at which the reaction between the KCl and the acid mixture takes place is gradually raised from 25° C. up to 500° C., but the optimum temperature for conducting the reaction is approximately 400° C.

The molar ratio of the $H_2SO_4$, $NOHSO_4$, $HNO_3$ in the mixture is equal to about 1:1:1.

The molar ratio between the feed KCl and the $H_2SO_4$ contained in the reaction mixture is preferably about 2.

The molar ratio between the NOCl and the $O_2$ in the oxidation mixture of NOCl to $NO_2$, is approximately 2.

The temperature of the oxidation reaction of NOCl to $NO_2$ is between about 200° C. and 600° C., and preferably about 400° C.

In order to further illustrate the present invention and the advantages thereof, the following specific examples are given, it being understood that these are merely intended to be illustrative and not limitative.

EXAMPLE 1

Into a rotary oven containing small porcelain balls there was introduced 100 gr./h. of KCl and 96.7 gr./h. of a solution containing 33.9% by weight $H_2SO_4$, 44.4% $NOHSO_4$ and 21.7% $HNO_3$ and the temperature thereof was gradually raised to 400° C. At the outlet of the oven there was collected 107 gr./h. of $K_2SO_4$ and 75.8 gr./h. of a gaseous mixture containing: 55.01% by weight NOCl; 29.82% by weight $Cl_2$ and 15.17% by weight $H_2O$. By cooling this mixture, the water was condensed, whereas the remaining gases were introduced, together with 10 gr./h. of oxygen, into an oven containing activated alumina maintained at 400° C. The gases coming from this last oven were conveyed to a tower filled with Raschig rings and they passed through, in counter-current, concentrated sulfuric acid, fed in a quantity of 65.7 gr./h.

From the top of the tower there was collected a gas containing 98% chlorine, whereas from the bottom of the tower there flowed the liquid acid mixture of $H_2SO_4$, $NOHSO_4$ and $HNO_3$, which was reconstituted during process operations and which was then conveyed to the rotary oven for reaction with KCl, and for again commencing the cycle.

EXAMPLE 2

Into a rotary oven containing small porcelain balls there was introduced 100 gr./h. of KCl and 86.8 g./h. of a solution containing:

| | Percent by weight |
|---|---|
| $H_2SO_4$ | 33.9 |
| $NOHSO_4$ | 44.4 |
| $HNO_3$ | 21.7 | and the thus formed mixture was then gradually brought to a temperature of 300° C.

From the oven there was collected 96.4 g./h. of $K_2SO_4$ and a gas containing 37.6 g./h. of NOCl; 20.3 g./h. of $Cl_2$ and 10.4 g./h. of $H_2O$. After the same was cooled and the $H_2O$ condensed, the gas was introduced into an oven containing activated alumina maintained at 400° C., and wherein 9.2 g./h. of $O_2$ were also introduced. The gas from the oven was conveyed to the bottom by a tower of Raschig rings, and from the top of which there was introduced 59.2 g./h. of concentrated $H_2SO_4$·41.3 g./h. of a gas containing 98% $Cl_2$ and the solution for reaction with KCl was extracted from this tower.

EXAMPLE 3

Into a rotary oven containing small porcelain balls there was introduced 100 g./h. of KCl and 97.8 g./h. of a solution containing:

| | Percent by weight |
|---|---|
| $H_2SO_4$ | 33.9 |
| $NOHSO_4$ | 44.4 |
| $HNO_3$ | 21.7 | and the thus formed mixture was then gradually brought to 500° C. From the oven there was collected 109.8 g./h. of $K_2SO_4$ and a gas containing 42.4 g./h. of NOCl; 23.0 g./h. of $Cl_2$ and 11.7 g./h. of $H_2O$. After the same was cooled and the water condensed the gas was introduced into an oven containing activated alumina maintained at 400° C., and wherein 10.4 g./h. of $O_2$ was also introduced.

The gas from the oven was conveyed to the bottom of a tower of Raschig rings, and from the top of which there was introduced 66.4 g./h. of concentrated $H_2SO_4$. From the tower there was extracted 46.7 g./h. of a gas containing 98% of $Cl_2$ and the solution for reaction with KCl.

As many apparently widely different embodiments of this invention may be made without departing from the spirit and scope thereof, it is to be understood that the same is not to be limited to the specific embodiments thereof, except as claimed in the appended claims.

What is claimed is:

1. A continuous process for the production of high titer, low residual acidity potassium sulfate and high purity chlorine gas comprising:
   (a) continuously reacting potassium chloride with a mixture of sulfuric, nitrosylsulfuric and nitric acids preheated to a temperature of from 200° C. to 500° C., said sulfuric, nitrosylsulfuric and nitric acids being present in the mixture in substantially equimolar ratios, whereby there are formed solid, neutral potassium sulfate ($K_2SO_4$) and a gaseous mixture of chlorine and nitrosyl chloride;
   (b) recovering said solid, neutral potassium sulfate;
   (c) oxidizing said gaseous nitrosyl chloride to a gaseous mixture comprised of chlorine and nitrogen dioxide;
   (d) treating the thus-formed gaseous nitrogen dioxide with sulfuric acid, whereby there is formed a mixture of nitrosylsulfuric, sulfuric and nitric acids;
   (e) recovering high purity chlorine gas; and
   (f) recycling the thus-formed mixture of nitrosylsulfuric, sulfuric and nitric acids to step (a).

2. The process as defined by claim 1, wherein step (c) the oxidation is effected by means of oxygen, at a temperature of from 200° C. to 600° C. and in the presence of a catalyst selected from the group consisting of silica and alumina.

3. The process as defined by claim 2, wherein step (a)

the molar ratio between the potassium chloride and the sulfuric acid is about 2.

4. The process as defined by claim 3, wherein step (c) the molar ratio between the nitrosyl chloride and the oxygen is about 2.

5. The process as defined by claim 2, wherein step (d) there is also treated with sulfuric acid unreacted nitrosyl chloride from step (c).

6. The process as defined by claim 1, wherein step (a) the mixture of acids is preheated to a temperature of from 350° C. to 450° C.

7. The process as defined by claim 2, wherein step (c) the oxidation is carried out at a temperature of about 400° C.

References Cited

UNITED STATES PATENTS

| | | | |
|---|---|---|---|
| 1,310,943 | 8/1916 | Datta | 23—219 |
| 2,150,669 | 3/1939 | Beekhuis | 23—219 |
| 3,049,417 | 8/1962 | Bradley et al. | 23—154 X |
| 3,069,233 | 12/1962 | Marullo et al. | 23—154 X |

OSCAR R. VERTIZ, *Primary Examiner.*

G. O. PETERS, *Assistant Examiner.*

U.S. Cl. X.R.

23—219